United States Patent
Kranz et al.

(10) Patent No.: US 6,347,082 B1
(45) Date of Patent: Feb. 12, 2002

(54) DIGITAL TELECOMMUNICATIONS SYSTEM

(75) Inventors: Christian Kranz, Ratingen Lintorf; Stefan Heinen, Krefeld, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/149,809

(22) Filed: Sep. 8, 1998

(30) Foreign Application Priority Data

Sep. 8, 1997 (DE) .......................... 197 39 225

(51) Int. Cl.[7] .......................... H04B 7/26; H04B 7/212; H04Q 7/20
(52) U.S. Cl. .................. 370/337; 370/347; 370/442; 370/915; 455/403; 455/426; 455/418
(58) Field of Search ................. 370/277, 280, 370/294, 310, 321, 336–337, 345, 347, 442, 478, 915; 455/74.1, 39, 403, 422, 426, 418, 465

(56) References Cited

U.S. PATENT DOCUMENTS 5,533,013 A * 7/1996 Leppanen .................. 370/347
5,550,992 A * 8/1996 Hashimoto ................. 455/422
6,038,455 A * 3/2000 Gardner et al. ............ 370/337
6,275,506 B1 * 8/2001 Fazel et al. ................ 370/478

FOREIGN PATENT DOCUMENTS

DE           19600197 C1    5/1997
EP           0670640 A2     9/1995

OTHER PUBLICATIONS

Published International Application No. 95/19071 (Elliott et al.), dated Jul. 13, 1995.

* cited by examiner

Primary Examiner—Wellington Chin
Assistant Examiner—Maikhanh Tran
(74) Attorney, Agent, or Firm—Herbert L. Lerner; Laurence A. Greenberg; Werner H. Stemer

(57) ABSTRACT

A digital telecommunications system has a base station and one or more wireless mobile parts. The mobile parts and the base station communicate according to the TDMA method. The frames of the TDMA method used in the telecommunications system have time slots of different lengths alternately succeeding one another within a TDMA frame.

7 Claims, 3 Drawing Sheets

DIGITAL TELECOMMUNICATIONS SYSTEM

BACKGROUND OF THE INVENTION

Field of the Invention

The invention belongs to the telecommunications field. More specifically, the invention pertains to a digital telecommunications system with one or more cordless mobile parts. The mobile parts and the base station exchange communication signals according to the TDMA method.

A telecommunications system of this type is, for example, a radio system operating according to the DECT standard.

The fundamental structure of such a radio system is illustrated in FIG. 2.

The system shown in FIG. 2 comprises a base station B and a plurality of cordless telecommunications terminals TE1 to TEn. In the exemplary embodiment, the cordless telecommunications terminals TE1 to TEn are mobile telephones which are able to communicate via radio with the base station B.

Instead of the cordless telecommunications terminals TE1 to TEn, or in addition, it is also possible to use cordless connection boxes for the connection of corded telecommunications terminals. The cordless telecommunications terminals, the cordless connection boxes and comparable devices are the mobile parts mentioned above in the introduction.

The data transmission between the base station B and the mobile parts is carried out in units of so-called frames, more precisely TDMA frames. The acronym TDMA stands for "Time Division Multiple Access" and states that the frames are constructed such that the base station can communicate with all the mobile parts registered with it in order in successive time slots (or slots) of a respective frame. The communication is effected in each case under the utilization of the full bandwidth of the transmission channel. The TDMA method is sufficiently known and requires no further explanation. The fundamental structure of a (TDMA) frame that is suitable for implementing the TDMA method is explained below with reference to FIG. 3.

As is evident from FIG. 3, such a frame, more precisely the DECT full-slot frame considered in this case, is composed of 24 time slots or slots (full slots) of identical length. The first 12 of the 24 slots are transmitted from the base station to the mobile parts, and the subsequent 12 slots are transmitted from the mobile parts to the base station. More precisely, the zeroth slot of each frame is transmitted from the base station to a zeroth mobile part, the first slot is transmitted from the base station to a first mobile part, the second slot is transmitted from the base station to a second mobile part, . . . , the eleventh slot is transmitted from the base station to an eleventh mobile part, and, conversely, the twelfth slot is transmitted from the zeroth mobile part to the base station, the thirteenth slot is transmitted from the first mobile part to the base station, the fourteenth slot is transmitted from the second mobile part to the base station, . . . , and the twenty-third slot is transmitted from the eleventh mobile part to the base station.

A frame or the 24 slots of a frame are transmitted within 10 ms. Each slot comprises 480 bits and is transmitted in about 417 $\mu$s (in 416.66 $\mu$s). As is indicated in FIG. 3, the 480 bits are distributed between a sync field having a width of 32 bits, a D field having a width of 388 bits, a Z field having a width of 4 bits, and a guard space field having a width of 56 bits.

320 bits are allocated within the D field for the transmission of the useful data actually of interest (for example voice data). Thus, within 10 ms, the base station can transmit useful data comprising 320 bits to each of the mobile parts and receive the same volume of useful data from each of the mobile parts. The transmission rate for useful data between the base station and each of the mobile parts is thus 32 kbit/s in each direction.

The DECT standard thus makes it possible to realize high-quality systems that can be used quite flexibly.

However, systems of that type are operated as efficiently as set forth above only in very rare cases. This is because in practice the base station and the mobile parts usually operate according to the so-called slow hopping principle, as a result of which the number of radio parts which can be operated from a base station is halved. The reason for this is that only every other slot can be used for the data transmission in the case of slow hopping. The remaining slots are used as so-called blind slots and are allocated for synchronization or readjustment of the transmitting and/or receiving frequency oscillator.

Use of the slow hopping principle mentioned proves to be advantageous because the base station and the radio parts can be constructed in a relatively simple manner on account of the long synchronizability or readjustability of the transmitting and/or receiving frequency oscillator. However, it is unfavorable insofar as the capability of expanding the system is considerably restricted as a result.

SUMMARY OF THE INVENTION

It is accordingly an object of the invention to provide a digital telecommunication system, which overcomes the above-mentioned disadvantages of the heretofore-known devices and methods of this general type and which permits the connection of a maximum number of mobile parts, while retaining a simple structure and a high transmission quality.

With the foregoing and other objects in view there is provided, in accordance with the invention, a digital telecommunications system, comprising:

- a base station and at least one wireless mobile part adapted to communicate with one another according to a TDMA method with TDMA frames;
- one of the base station and the at least one mobile part being programmed to communicate in time slots of mutually different lengths alternately succeeding one another within a TDMA frame.

In accordance with an added feature of the invention, the time slots in the TDMA frame comprise relatively shorter time slots and relatively longer time slots, and wherein the relatively shorter time slots are used for synchronizing or readjusting a transmit and/or receive frequency oscillator of the base station and/or the one or more mobile parts.

In accordance with an additional feature of the invention, a duration of the relatively shorter time slots in the TDMA frame is equal to a duration of a blind slot in a telecommunications system operating according to the DECT standard.

In accordance with another feature of the invention, the relatively longer time slots are data transmission time slots used for data transmission between the base station and the mobile parts.

In accordance with a further feature of the invention, the novel telecommunications system, i.e. the base station and the at least one mobile part, are adapted to operate in the 2.4 GHz ISM band.

In accordance with a concomitant feature of the invention, the base station and the at least one mobile part are modified DECT standard telecommunications system components, modified to allow the TDMA frames with the alternatingly shorter and longer time slots.

As noted, of the time slots of different lengths in each TDMA frame, the shorter time slots are used for the synchronization or readjustment of the transmitting and/or receiving frequency oscillator of the base station and/or of the mobile parts, and the longer time slots are used for the data transmission. It is thereby possible to reduce the proportion of time which is available per unit time for the synchronization or readjustment of the transmitting and/or receiving frequency oscillator. This, correspondingly, increases the proportion of time available per unit time for the data transmission.

The more time is available per frame for the data transmission, the more mobile radio parts can be connected to a base station (with conditions that are otherwise unchanged).

On the other hand, however, the reduced proportion of time for the synchronization or readjustment of the oscillator need not in any way have a negative effect, since the time periods available for synchronization or readjustment and also the intervals between these time periods do not thereby automatically become too short or too long for proper synchronization or readjustment. Apart from this, the reduction in the time available for synchronization or readjustment can be carried out in steps of greater or lesser increment, in particular in systems having a very large number of time slots or slots per frame, with the result that a setting that satisfies all the requirements can be found without difficulty here.

Consequently, the novel telecommunications system permits the connection of a maximum number of mobile parts in conjunction with, as before, a simple structure and a high transmission quality.

Other features which are considered as characteristic for the invention are set forth in the appended claims.

Although the invention is illustrated and described herein as embodied in a digital telecommunications system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

The telecommunications system described in more detail below resembles a DECT standard system in large part, namely a digital telecommunications system with one or more cordless mobile parts. However, the illustrated exemplary embodiment is laid out to operate in the so-called 2.4 GHz ISM band. The 2.4 GHz ISM band, that extends from 2400 to 2483.5 MHz, has recently been released by the FCC (Federal Communication Commission) for the operation of telecommunications systems of this kind under certain conditions.

It will nevertheless be understood from a reading of the description that the telecommunications system according to the invention is not only suitable for use in the 2.4 GHz ISM band, but rather, in principle, can also be used in any other frequency bands.

The communication between the mobile parts and the base station may take place via TDMA frames comprising a multiplicity of time slots or slots, as in the case of the conventional system described in the introduction.

The slots are partly slots designed for data transmission and partly slots designed for the synchronization or readjustment of the transmitting and/or receiving frequency oscillator of the base station and/or of the mobile parts. The two types of slots follow one another individually in alternation. The slots for the synchronization or readjustment of the transmitting and/or receiving frequency oscillator of the base station and/or of the mobile parts are referred to below as guard slots, for the sake of simplicity.

Figure 1:
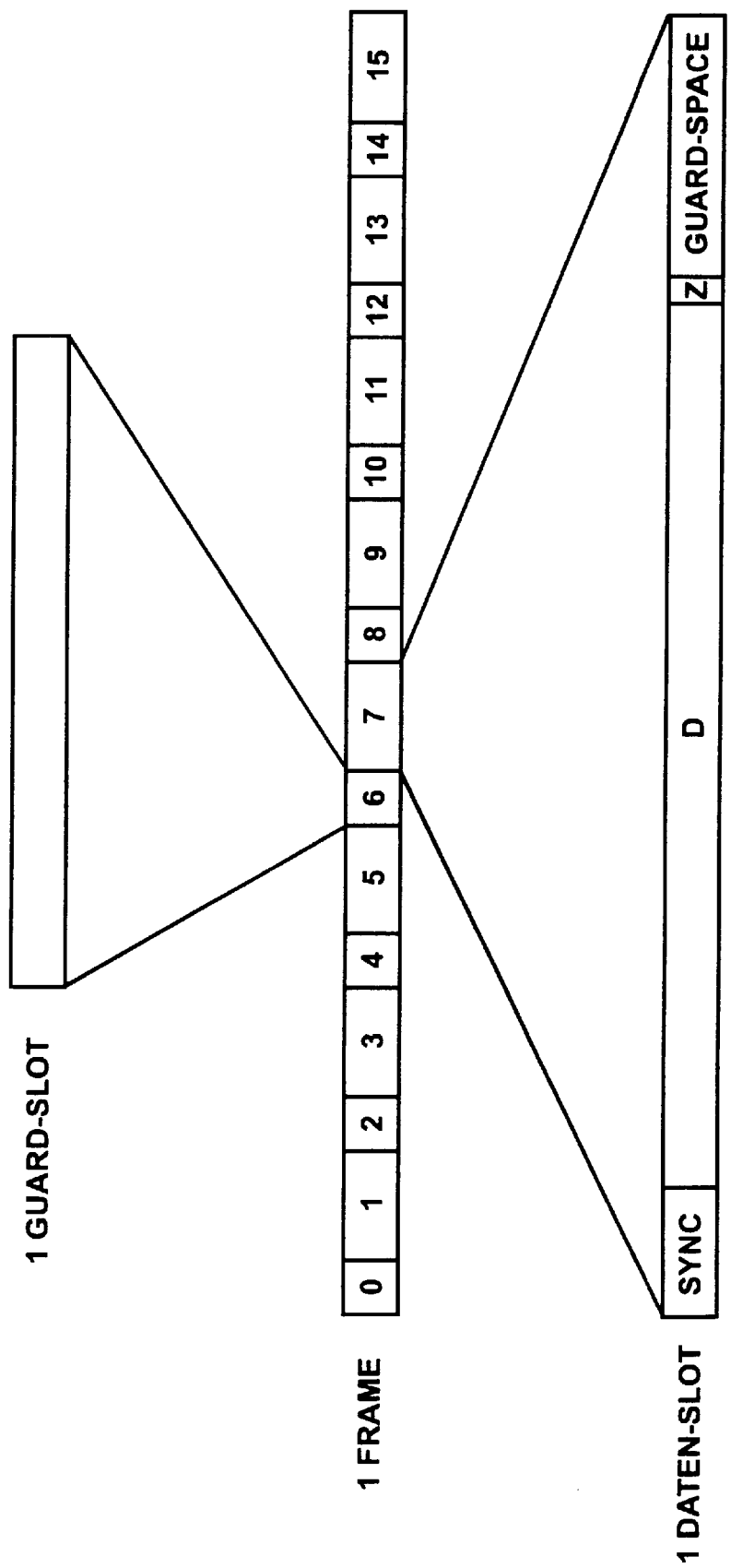
FIG. 1 is a schematic diagram of the data format used in the data exchange between a base station and telecommunications terminals, communicating with the latter, of a telecommunications system according to the invention.

The structure of such a frame is illustrated in FIG. 1 and reference will now be had to that figure in the following detailed description:

The frame of FIG. 1 comprises 16 slots that are consecutively numbered from 0 to 15, for the sake of clarity. The (shorter) slots having even numbers are in this case the guard slots, and the (longer) slots having odd numbers are the (data) slots designed for data transmission. In the first half of the frame (slots 0 to 7), data are transmitted from the base station to the mobile parts, and in the second half of the frame (slots 8 to 15), data are transmitted from the mobile parts to the base station. More, precisely, the first slot of each frame is transmitted from the base station to a zeroth mobile part, the third slot is transmitted from the base station to a first mobile part, the fifth slot is transmitted from the base station to a second mobile part, the seventh slot is transmitted from the base station to a third mobile part, and, conversely, the ninth slot is transmitted from the zeroth mobile part to the base station, the eleventh slot is transmitted from the first mobile part to the base station, the thirteenth slot is transmitted from the second mobile part to the base station, and the fifteenth slot is transmitted from the third mobile part to the base station.

In the exemplary embodiment, the frame according to FIG. 1 has a total duration of 10 ms, whereby: each of the guard slots, that is to say each of the slots 0, 2, 4, 6, 8, 10, 12, and 14, occupies about 416 $\mu$s (416.66 $\mu$s), and each of the data transmission slots, that is to say each of the slots 1, 3, 5, 7, 9, 11, 13, and 15, occupies about 833 $\mu$s (833.33 $\mu$s).

480 bits are transmitted within the 833 $\mu$s of a slot designed for data transmission. As is indicated in FIG. 1, these 480 bits are distributed between a sync field having a width of 32 bits, a D field having a width of 388 bits, a Z field having a width of 4 bits, and a guard space field having a width of 56 bits.

Figure 3:
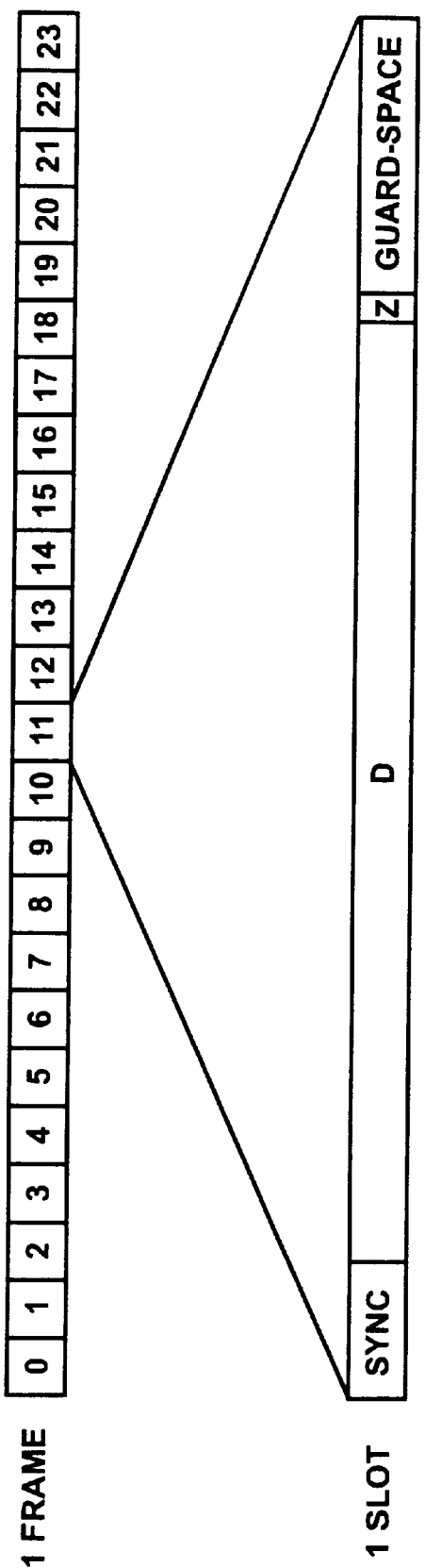
FIG. 3 is a schematic diagram of the data format used in the data exchange between a base station and telecommunications terminals of a conventional radio system operating according to the DECT standard.

The structure of the data transmission slots (1, 3, 5 . . . ) corresponds entirely to the structure of the slots of the DECT frame described in the introduction with reference to FIG. 3. Only the period of time within which such a slot is transmitted is different. As a result, the slots designed for data transmission as shown in FIG. 1 can be handled in essentially exactly the same way as the slots of a DECT frame. Quite advantageously, for instance, the baseband chip used in the DECT system can be employed without change, or at most slightly modified.

The slower transmission of the data to be transmitted is preferably brought about by correspondingly modifying a bit clock pulse which is constant with respect to time and determines the transmission rate, the modification consisting in halving the frequency of the bit clock pulse in the exemplary embodiment. This halving is preferably realized by inserting a corresponding divider into the bit clock pulse generator. The slower transmission of the data to be transmitted (lower bit repetition rate) is provided in the present case in order not to exceed the transmission channel bandwidth that is permissible in the 2.4 GHz ISM band.

320 bits are allocated within the D field for the transmission of the useful data actually of interest (for example voice data). Thus, within 10 ms, the base station can transmit useful data comprising 320 bits to each of the mobile parts and receive the same volume of useful data from each of the mobile parts. The transmission rate for useful data between the base station and each of the mobile parts is thus 32 kbit/s in each direction, as also in the case of telecommunications systems operating according to the DECT standard.

The guard slots are only half as long as the data transmission slots. Their length corresponds to 240 bits. However, when viewed with respect to time, they are exactly the same length as the slots which are provided in the conventional frame in accordance with FIG. 3 for the synchronization or readjustment of the transmitting and/or receiving frequency oscillator of the base station and/or of the mobile parts (blind slots). All that differ are the time intervals after which, in each case, renewed synchronization or readjustment of the oscillator can be effected.

Since "only" the time intervals between successive synchronizations or readjustments are lengthened, yet even the lengthened intervals are extremely short (merely the 833 $\mu$s of a data transmission slot elapse between the end of one synchronization or readjustment and the beginning of the next synchronization or readjustment), the telecommunications system described can be operated with no, or at least with no appreciable, qualitative losses.

This also applies to the case where the guard slots are shorter than the blind slots. This is because even in the event of a significant shortening, the period of time available for synchronization or readjustment would still be a multiple longer than if no specific slots were allocated for this (only the above-mentioned guard space field of the data transmission slots would then be available for this).

On the other hand, the shortening of the guard slots that is effected relative to the slots designed for data transmission, makes it possible, however, for the period of time which is available for the data transmission slots per unit time (per frame) to be able to be made relatively and absolutely longer. As a result, a larger volume of useful data can be transmitted per unit time (per frame), which, for its part, can in turn be utilized for transmitting the information to be transmitted (for example speech) with a better quality and/or to set up an increased number of connections (to connect more mobile parts to the base station).

If the quality of the information to be transmitted is maintained unchanged, then it is possible to connect one mobile part more to the base station in the exemplary embodiment; if the conventional blind slots, that is to say slots which have exactly the same length as the slots designed for data transmission, were used for the synchronization and readjustment of the oscillator instead of the shortened guard slots, only three rather than four mobile parts could be connected to the base station.

Figure 2:
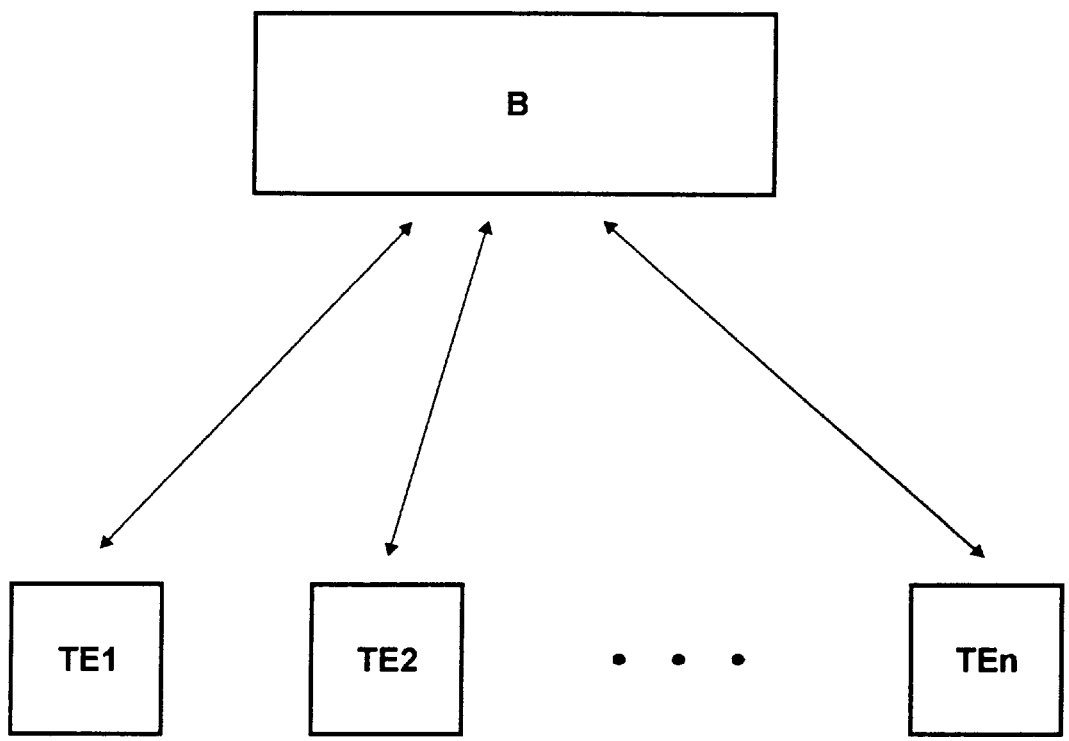
FIG. 2 is a diagram of the structure of a radio system operating according to the DECT standard.

The fact that the number of mobile parts which can be connected to a base station is nevertheless smaller than in the case of systems operating according to the DECT standard as shown in FIGS. 2 and 3 is due to the transmission of the information to be transmitted in the exemplary embodiment only being half as fast. As was already mentioned above, this is necessary owing to the design of the telecommunications system described for the 2.4 GHz ISM band.

The slower transmission (transmission rate) has, as was already mentioned above, the consequence that the slots designed for data transmission are twice as long as the corresponding slots of the DECT frame in accordance with FIG. 3.

Since this and the altered frequency of the bit clock pulse are the only differences from the conventional telecommunications system described in the introduction, it is possible for the digital part of the conventional telecommunications system described in the introduction also to be used, with slight modifications, for the telecommunications system described.

In view of the fact that the telecommunications system described can be adapted to altered technical requirements (smaller transmission bandwidth) and, furthermore, has been considerably improved in respect of its efficiency (connectability of additional mobile parts), this is an astonishingly simple route to the practical realization of the telecommunications system described.

The RF (radio-frequency) part of the telecommunications system described, by which one or more carrier frequencies determined by the transmission channel are modulated in accordance with the data to be transmitted, or the transmitted data are recovered by demodulation, differs in its nature, on account of the different carrier frequencies, from the RF parts of conventional telecommunications systems. The RF part of the telecommunications system described must therefore be modified, that is to say adapted to the changed carrier frequencies.

In summary, the novel telecommunications system permits the connection of a maximum number of mobile parts, while retaining the desirable simple structure and high transmission quality.

We claim:

1. A digital telecommunications system, comprising:
   a base station and at least one wireless mobile part adapted to communicate with one another according to a TDMA method with TDMA frames;
   one of said base station and said at least one mobile part being programmed to communicate in time slots of mutually different lengths alternately succeeding one another within a TDMA frame.

2. The telecommunications system according to claim 1, wherein the time slots in the TDMA frame comprise relatively shorter time slots and relatively longer time slots, and wherein the relatively shorter time slots are used for synchronizing or readjusting a frequency oscillator of one of said base station and said at least one mobile part.

3. The telecommunications system according to claim 2, wherein the frequency oscillator is one of a receive frequency oscillator and a transmit frequency oscillator.

4. The telecommunications system according to claim 2, wherein a duration of the relatively shorter time slots in the TDMA frame is equal to a duration of a blind slot in a telecommunications system operating according to the DECT standard.

5. The telecommunications system according to claim 1, wherein the time slots in the TDMA frame comprise relatively shorter time slots and relatively longer time slots, and wherein the relatively longer time slots are data transmission time slots.

6. The telecommunications system according to claim 1, wherein said base station and said at least one mobile part are adapted to operate in a 2.4 GHz ISM band.

7. The telecommunications system according to claim 1, wherein said base station and said at least one mobile part are modified DECT standard telecommunications system components.

* * * * *